United States Patent [19]

Katsuyama

[11] Patent Number: 4,940,207
[45] Date of Patent: Jul. 10, 1990

[54] AUTOMATIC VALVE

[75] Inventor: Kazuo Katsuyama, Toyota, Japan

[73] Assignee: Trinity Industrial Corporation, Tokyo, Japan

[21] Appl. No.: 305,205

[22] Filed: Feb. 2, 1989

[30] Foreign Application Priority Data

Feb. 29, 1988 [JP] Japan .............................. 63-24975[U]

[51] Int. Cl.$^5$ ..................... F16K 31/08; F16K 31/122
[52] U.S. Cl. .................................. 251/65; 251/63.5; 355/306
[58] Field of Search .................. 251/63.5, 65; 335/306

[56] References Cited

U.S. PATENT DOCUMENTS

| 3,212,751 | 10/1965 | Hassa | 251/65 |
| 3,347,262 | 10/1967 | Gibson | 251/65 |
| 3,355,140 | 11/1967 | Andersen | 251/65 |
| 3,977,436 | 8/1976 | Larner | 251/65 |
| 4,285,495 | 8/1981 | King | 251/63.5 |
| 4,382,578 | 5/1983 | Ruyak | 251/65 |

FOREIGN PATENT DOCUMENTS

60-8582 1/1985 Japan .

Primary Examiner—George L. Walton
Attorney, Agent, or Firm—Cushman, Darby & Cushman

[57] ABSTRACT

An automatic valve comprising a first cylindrical magnet as a part of a valve rod axially slidable in a valve chamber for opening and closing a valve port and a second cylindrical magnet as a part of a piston disposed around and coaxially with the first cylindrical magnet for magnetically actuating the valve member under pneumatic control, in which respective ring magnets constituting each of the first and the second cylindrical magnets are stacked such that identical magnetic poles are axially faced to each other increasing the magnetic attraction force and also such that respective ring magnets in the second magnet are slightly deviated from those in the first magnet in the direction of closing the valve port for resisting the external valve-opening force. The piston has a spring for normally closing the valve ports and a round-about air discharge channel formed therein for discharging air when actuated by pressurized air against the spring force for reducing the number of air hoses, etc. The valve member is disposed at the inside of the valve chamber with a fluid channel formed therebetween which can be utilized also as a passage for a cleaning solvent.

3 Claims, 4 Drawing Sheets

AUTOMATIC VALVE

BACKGROUND OF THE INVENTION

1. Field of the Invention

The present invention concerns an automatic valve for controlling the flow of fluid and, more specifically, it relates to an automatic valve for controlling the flow of fluid which valve is adapted to conduct ON-OFF operations utilizing the magnetic attraction force between permanent magnets.

2. Description of the Prior Art

Figure 6:
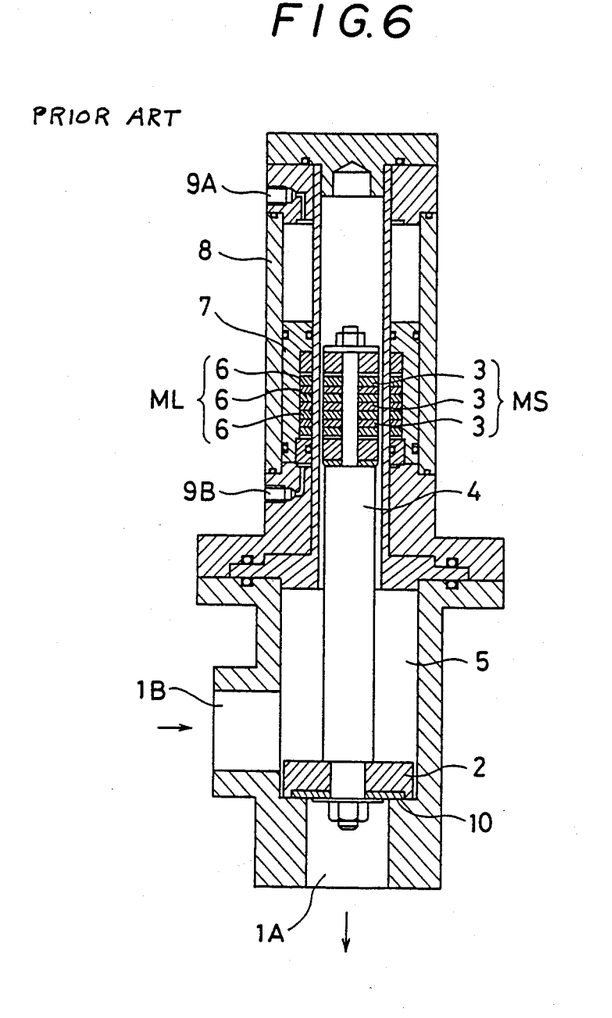
FIG. 6 is a longitudinal cross sectional view showing a conventional automatic valve.

Automatic valves of the afore-mentioned type have been disclosed, for example, in Japanese Utility Model Application Laid-Open Sho 60-8582. Referring to the descriptions in the specification and the drawings (the outline of which is illustrated in FIG. 6 of the drawings, appended hereto only for the reference), a valve shaft 4 that has a valve body 2 formed at the top end thereof for closing a fluid port 1A and a multi-layered cylindrical magnet MS of a small diameter comprising a plurality of ring magnets 3, 3,—stacked axially on the shaft and mounted on the rear end thereof, are housed within a valve chamber 5 so as to be axially slidable relative to the valve chamber.

At the outside of the valve chamber 5, a multi-layered cylindrical magnet ML of a large diameter comprising a plurality of axially stacked ring magnets 6, 6—is disposed coaxially with the cylindrical magnet MS and slidably along the axial direction of the valve shaft 4. In the stack of the magnets MS and ML, the magnetic polarity (N or S) is made different between each of ring magnet pair 3 and 6 radially opposed to each other. A piston 7 having the cylindrical magnet ML is disposed within a cylinder 8 and adapted to slide in a direction for opening or closing the valve by a pressurized air or gas. The cylinder 8 has ports 9A and 9B for the pressurized air or gas, formed at both of the top and rear ends thereof on both sides of the piston 7, so that the piston 7 is driven by the pressure of the pressurized air or gas supplied alternately from the ports 9A and 9B.

When the piston 7 is caused to slide in the direction of opening or closing the valve 7, the valve shaft 4 mounted with the multi-layered cylindrical magnet MS is caused to slide forwardly and backwardly by the magnetic attraction force of the cylindrical multi-layered magnet ML, as a part of the piston 7, to actuate the valve body 2, thereby opening or closing the fluid port 1A.

Since the valve shaft 4 housed within the valve chamber 5 is adapted to move slidingly without protruding to the outside through the side wall of the valve chamber 5, thereby actuating the valve body 2 attached at the top end of the shaft 4, a tight sealing can be obtained in the valve chamber 5 formed between the two ports 1A and 1B.

However, in a case where the automatic valve of such a structure is used, for example, as a color-change valve in a multi-color coating apparatus, there are various problems.

Firstly, the valve body 2 when put in a closed state, may possibly be separated from the valve seat 10 under the effect of back pressure of paint acting from the side of the port 1A.

Specifically, the valve of FIG. 6, when used as a paint color-change valve is connected, for example, at the port 1B, to a paint supply source of a certain color and connected at the other port 1A, by way of a paint hose, to a manifold connected to a coating machine. However, since other color-change valves for supplying paints of other different colors are also connected with the manifold, if the magnetic attraction force between the cylindrical magnets MS and ML for closing the color-change valve is not strong enough, the valve body 2 for closing the port 1A may possibly be separated from the valve seat 10 under the effect of the pressure of a paint of different color supplied from other color-change valve to the inside of the manifold. This may bring about a risk of defective coatings due to the intrusion of the paint of different color into the valve chamber 5 and result in mixing of these paints Secondly, in the conventional automatic valve shown in FIG. 6, since the piston 7 is adapted to be driven by alternately supplying pressurized air or gas (simply referred to as air, hereinafter) from the ports 9A and 9B formed on both of the top and rear ends of the cylinder 8, air hoses have to be connected to both of the ports 9A and 9B.

When the conventional automatic valve is used as a color-change valve in a multi-color coating apparatus for conducting coating under color-change, e.g., for more than thirty kinds of colors, since a great number of air hoses have to be disposed in addition to a number of paint hoses, the number of pipeways, as well as switching valves for selectively supplying pressurized air to be respective air hoses is also increased, so as to necessitate the expenditure of a huge installation cost and require a larger installation space.

Furthermore, when the piston 7 is driven by the pressurized air supplied from one of the ports 9A or 9B, since the air pressurized by the piston 7 in the cylinder 8 has to be discharged from the other of the ports 9B or 9A, the ON-OFF control for the switching valve disposed to each of the air hoses becomes extremely complicated.

In order to overcome such a problem, the present inventors have attempted to put the piston 7 under the resiliency of a spring that normally closes the valve and drive the piston in the valve opening direction by the pressurized air supplied from the opposite direction and, at the same time, release the air pressurized in the cylinder 8 upon driving the piston 7 directly to the outside through a discharge hole perforated to the circumference of the cylinder 8.

However, in the automatic valve used for the color-change valve, since a solvent such as a thinner is blown to the surface thereof for cleaning and removing a paint which is sprayed from the coating machine and deposited thereon, the solvent may possibly intrude through the hole perforated in the circumference of the cylinder 8 to the inside thereof, thereby deteriorating the sealing members such as rubber packings, etc. disposed on the inside of the cylinder.

Thirdly, when the automatic valve illustrated in FIG. 6 is used as a paint supply valve for controlling the flow of paint supplied to a coating machine, the paint remaining in the valve chamber 5 can not completely be removed upon cleaning of paint pipeways in which the valve is disposed.

Specifically, if a cleaning solvent is supplied, for example, from the port 1B into the valve chamber 5 and discharged from another port 1A, it is impossible to completely remove the paint that has intruded into narrow gaps formed between the inner circumferential surface of the cylindrical magnet MS that slides integrally with the valve shaft 4 or the paint that has further invaded as far as the rear end of the valve shaft 4 passing through such gaps. This may possibly allow the paint to remain in the valve chamber 5 in sliding contact with the circumferential surface of the cylindrical magnet MS.

Furthermore, if the paint intruding between the circumferential surface of the cylindrical magnet MS and the inner wall of the valve chamber 5 in sliding contact with each other remains and solidifies there, it is no more possible to move the cylindrical magnet MS with the magnetic force of the cylindrical magnet ML, thereby hindering the valve ON-OFF operation.

SUMMARY OF THE INVENTION

It is, accordingly, a first object of the present invention to provide an automatic valve of the aforementioned structure, but one capable of maintaining a valve body in a completely closed state even when a backward fluid (e.g. from paint) pressure is exerted, by increasing the magnetic attraction force created between two cylindrical magnets without enlarging the size of them.

A second object of the present invention is to provide an automatic valve of the aforementioned structure, but which is capable of decreasing the number of air hose pipeways, by perforating a discharge hole to a cylinder, while effectively preventing the intrusion of solvent to the inside of the cylinder through such a discharge hole.

A third object of the present invention is to provide an automatic valve of the afore-mentioned structure, but which is capable of surely preventing color paints from remaining in the valve chamber upon cleaning the inside of the chamber, and preventing remained paints from solidification after the cleaning which would otherwise hinder the sliding movement of the cylindrical magnet MS in the valve chamber.

The foregoing first object of the present invention can be attained by an automatic valve comprising:

a valve chamber having at least two fluid ports;

a valve shaft contained in the valve chamber slidably in the axial direction thereof, the valve shaft having a valve body formed at the top end thereof for closing one of the fluid ports and a first cylindrical multi-layered magnet of a smaller diameter attached at the rear end thereof and comprising a plurality of axially stacked ring magnets;

a cylinder disposed to the outer side of and coaxially with the valve chamber;

a piston disposed axially slidably within the cylinder and adapted to move in the direction of opening the valve by the pressure of a pressurized gas or air;

a second cylindrical multi-layered magnet of a large diameter comprising a plurality of axially stacked ring magnets, which is constituted as a part of the cylinder and arranged coaxially with the first cylindrical magnet such that the respective ring magnets in the first cylindrical magnet and the respective ring magnets in the second cylindrical magnet are radially opposed to each other with different magnetic polarity; in which the respective ring magnets are stacked in each of the first and the second cylindrical magnets such that identical magnetic poles are faced to each other in each axially adjacent pair of ring magnets, and the respective ring magnets in the second cylindrical magnet are so situated that they are axially displaced slightly toward the direction of closing the valve relative to the respective radially opposed ring magnets in the first cylindrical magnet with different magnetic polarity.

The second object of the present invention can be attained by the automatic valve of the just mentioned constitution, in which a spring is disposed to the piston for resiliently energizing the piston toward the direction of closing the valve, the cylinder has a port formed at a position corresponding to one side of the piston for receiving a pressurized air or other gas that causes the piston to move slidingly against the resiliency of the spring in the direction of opening the valve and a discharge hole formed at a position corresponding to the other side of the piston, and the discharge hole comprises a discharge channel opened to the inside of the cylinder, a discharge channel opened to the outside of the cylinder and a round-about bent channel for communicating both of the channels with each other.

The third object of the present invention can be attained by the automatic valve of the just mentioned constitution in which an outer diameter of the first cylindrical multi-layered magnet attached to the rear end of the valve shaft is made smaller than the inner diameter of the valve chamber, so as to define a fluid channel between the outer circumferential surface of the first cylindrical magnet and of the valve shaft and the inner wall surface of the valve chamber, and fluid ports are formed on both axial ends of the channel opposing to both of the top and the rear ends of the valve shaft respectively.

In the automatic valve according to the present invention, since each of the first cylindrical magnet attached on the rear end of a valve shaft housed axially slidably within the valve chamber and the second cylindrical magnet disposed on the outside of the valve chamber axially slidably is arranged, so that respective ring magnets are so stacked that identical magnetic poles face each other in each axially adjacent pair of ring magnets, magnetic fluxes from each of the cylindrical magnets are extremely increased and, accordingly, the magnetic attraction force exerted between both of them becomes greater.

As is well-known, when different poles of two opposing magnets i.e., N and S poles are bought in contact with each other, the magnetic poles at their opposed surfaces are eliminated. If instead they are brought close to each other although not into direct contact, magnetic fluxes emitting, for example, from the N pole of one of the magnets are concentrated toward the S pole of the other of the magnets. In such a case, the magnetic attraction force exerted, for example, between the N-pole of the afore-mentioned one magnet and the S-pole of the third magnet opposed thereto is extremely weakened.

On the other hand, if adjacent magnets are opposed to each other at their identical polarity as seen in the cylindrical magnets in the present invention, since a great quantity of magnet fluxes are emitted, for example, from the two N poles opposing each other in each pair of adjacent magnets, and such magnetic fluxes are concentrated toward the S poles of the magnet pair in the other cylindrical magnet opposed thereto, the magnetic attraction force exerted between the two cylindrical magnets becomes extremely strengthened.

In addition, since the respective ring magnets in the second cylindrical magnet are so situated that they are slightly displaced axially toward the direction of closing the valve relative to the respective radially opposed ring magnets in the first cylindrical magnet with different polarity in the closed state of the valve, and the valve shaft attached to the first cylindrical magnet is energized in the direction of closing the valve by the magnetic attraction force exerted between them under this state, the valve body formed at the top end of the valve shaft can be maintained at a completely closed state against the backward pressure of the fluid exerted thereon.

In another embodiment of the present invention, since the spring is disposed to the piston for resiliently energizing the piston toward the direction of closing the valve, the cylinder has a port formed at a position corresponding to one side of the piston for receiving a pressurized gas or air that causes the piston to move slidingly against the resiliency of the spring in the direction of opening the valve when a pressurized gas or air is supplied from the gas port in the closed state of the valve, the piston including the second cylindrical magnet is caused to slide in the direction of opening the valve against the resiliency of the spring and, by the magnetic attraction therewith, the valve shaft attached with the first cylindrical magnet is also caused to slide in the direction of opening the valve, to thereby open the fluid port which has been closed so far with the valve body formed at the top end of the valve shaft.

In this instance, gas or air present in the cylinder is discharged out of the cylinder through the discharge hole formed on the opposite side.

Then, when the supply of the pressurized gas or air is interrupted, the piston which has been caused to slide in the direction of opening the valve is now caused to slide in the direction of closing the valve by the resiliency of the spring and, along therewith, the valve shaft is also caused to slide in the direction of closing the valve, thereby closing the fluid port again by the valve body formed at the top end of the valve shaft.

With such a embodiment, since only one port is necessary for the pressurized gas or air that drives the piston, the number of air hose pipeways for supplying the pressurized gas or air can be decreased.

Moreover, since the cylinder has a discharge hole formed at a position corresponding to the other side of the piston, and the discharge hole comprises a discharge channel which is open to the outside of the cylinder and a roundabout bent channel for communicating both of the channels with each other, if the cleaning solvent blown onto the surface of the automatic valve should enter into the discharge channel which is open to the outside of the cylinder, it can not reach the discharge channel which is open to the inside of the cylinder beyond the discharge channel, being hindered by the round-about bent channel.

Accordingly, when paint deposited to the surface of the automatic valve used as a color-change valve in a multi-color coating apparatus is cleaned by a solvent such as a thinner, it is possible to prevent intrusion of the solvent into the inside of the cylinder, which would otherwise deteriorate the packings, etc. made of rubber.

In a further construction according to of the present invention, since a fluid channel is defined between the outer circumferential surface of the first cylindrical magnet and of the valve shaft and the inner wall surface of the valve chamber, and fluid ports are formed on both axial ends of the channel opposing both of the top and rear ends of the valve shaft respectively, when the piston including the second cylindrical magnet is caused to slide in the direction of opening the valve and, along therewith, the valve shaft having the valve body formed at the top end thereof and the first cylindrical magnet formed at the rear end thereof is moved in the direction of opening the valve, entering paint supplied, for example, from the fluid port opposed to the rear end of the valve shaft, is passed through the channel formed between the outer circumferential surface of the first cylindrical magnet and the valve shaft and the inner circumferential wall of the valve chamber, discharged out of the fluid port opposed to the top end of the valve shaft and then supplied to the coating machine.

Then, in the case of interrupting the supply of the paint to the coating machine and cleaning the inside of the valve chamber, a solvent such as a thinner supplied instead of the paint is caused to flow from the port opposed to the rear end of the valve shaft to the inside of the valve chamber, passed through the channel and then discharged from the port opposed to the top end of the valve shaft, whereby the surface of the valve shaft and the first cylindrical magnet attached to the rear end of the shaft, as well as the inner wall of the valve chamber can be cleaned completely and the paint remaining in the valve chamber can be removed completely.

Accordingly, this can prevent the paint from remaining in the valve chamber or and prevent the solidification of paint between the outer circumferential surface of the first cylindrical magnet and the inner wall of the valve chamber, which would otherwise hinder the sliding movement of the cylindrical magnet.

DESCRIPTION OF THE DRAWINGS

These and other objects, as well as advantageous features of the present invention will become more apparent upon reading the following descriptions of preferred embodiments according to the present invention, referring to the accompanying drawings, wherein:
In the drawings

DESCRIPTION OF THE PREFERRED EMBODIMENTS

The present invention is to be explained specifically by way of its preferred embodiments referring to the accompanying drawings.

Figure 1:
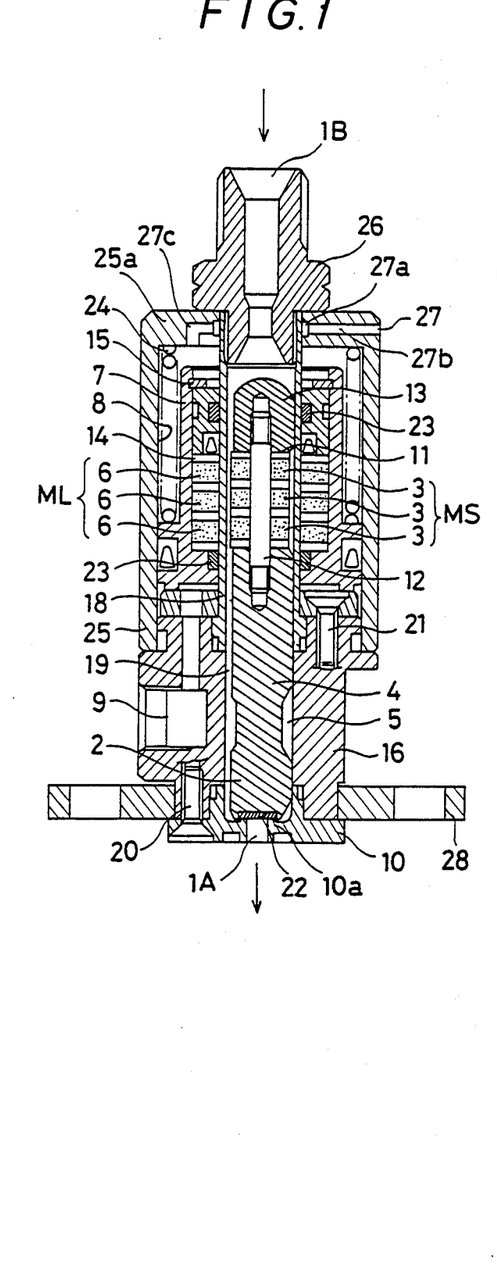
FIG. 1 is a longitudinal cross sectional view showing one embodiment of an automatic valve according to the present invention.
Figure 2:
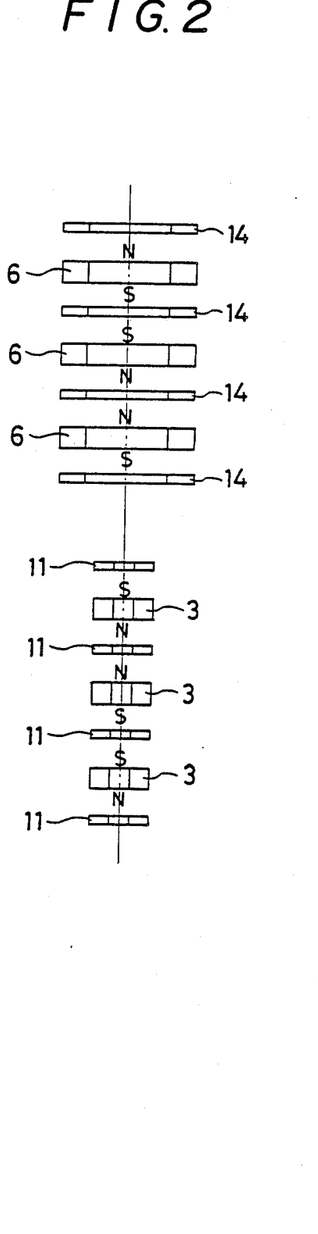
FIG. 2 is an enlarged cross sectional view illustrating the arrangement of ring magnets that constitute a first cylindrical multi-layered magnet of a smaller diameter and a second cylindrical multi-layered magnet of a larger diameter, respectively.
Figure 3:
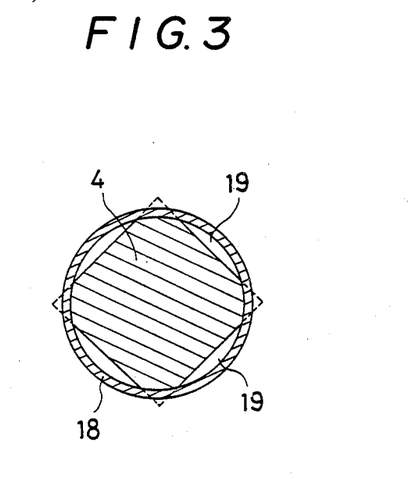
FIG. 3 is a cross sectional view of a valve shaft.
Figure 4:
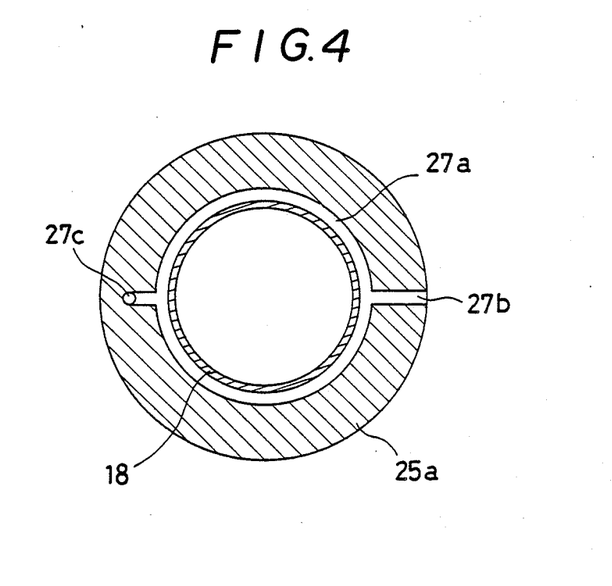
FIG. 4 is a transverse cross-sectional view showing the shape of a discharge hole formed through the cylinder.

FIG. 1 is a longitudinal cross sectional view showing one embodiment of an automatic valve according to the present invention. FIG. 2 is an enlarged cross-sectional view illustrating the arrangement of magnet rings that constitute a first cylindrical multi-layered magnet of a smaller diameter and a second cylindrical multi-layered magnet of a larger diameter, respectively. FIG. 3 is a cross sectional view of a valve shaft. FIG. 4 is a transverse cross-sectional view showing the shape of a discharge hole formed through the cylinder.

In FIG. 1 through FIG. 4, components or members corresponding to those shown in FIG. 6 carry the same reference numerals and detailed explanations of these components or members are omitted.

In the embodiment shown in FIGS. 1 and 2, respective ring magnets 3, 3,—constituting a first cylindrical multi-layered magnet MS of a smaller diameter and respective ring magnets 6, 6,—constituting a second cylindrical multi-layered magnet ML of a larger diameter are stacked such that identical magnetic poles are faced to each other in each pair of axially adjacent ring magnets 3, 3 or 6, 6 as shown in FIG. 2. Further, respective ring magnets 6, 6,—of the first cylindrical magnet ML are so situated that they are slightly displaced axially in the direction of closing the valve relative to the respective radially opposed magnet rings 3, 3,—of the first cylindrical magnet ML with different magnetic polarity.

Each of the ring magnets 3, 3,—is interposed between each pair of ring-like yokes 11, 11 of the same diameter, fitted over the outer circumference of a bolt 12 mounted on the rear end of the valve shaft 4 and clamped thereto by means of a nut 13 engaged to the bolt 12 against the repulsive force exerted between adjacent N poles and between adjacent S poles in each other of the adjacent magnet pair 3, 3,—.

In a similar manner, each of the ring magnets 6, 6,—is interposed between a pair of ring-like yokes 14 and 14 of the same diameter, fitted in the cylindrical piston 7, and clamped in an integrally stacked state against the repulsive force exerted between the opposed identical magnetic poles in each of the axially adjacent magnets 6, 6—by means of a C-shaped stopper ring 15 fitted into a radially inwardly-opening circumferential groove shown provided in the inner wall of the piston 7.

The first cylindrical magnet MS attached to the rear end of the valve shaft 4 has an outer diameter smaller than the inner diameter of a valve chamber 5 that is defined within a hollow body 16 having a valve seat 10 defining therein a flow port 1A at one end thereof and a cylindrical tube 18 made of aluminum and attached to the other end thereof, so that a channel 19 is formed between the outer circumferential surface of the valve shaft 4 and the first cylindrical magnet MS and the inner wall surface of the valve chamber 5 for allowing a fluid to pass therethrough.

As shown in FIG. 3, the valve shaft 4 is manufactured by chamferring the four corners of a square metal Thus, the valve shaft 4 has such a cross-sectional shape that inscribes, at each of the edges thereof, the inner circumferential wall surface of the valve chamber 5 so that an axially straight gap (floor channel) is formed between each of axial sides of the valve shaft 4 and the inner circumferential wall surface of the valve chamber 5. rod by turned on a lathe, so as to provide a wide channel 19.

In order to situate the cylindrical first magnet MS attached to the rear end of the valve shaft 4 at the center of the valve chamber 5 while having the fluid channel 19 in the valve chamber 5, it is necessary that the valve shaft 4 be in sliding contact at the outer circumferential surface thereof with the inner wall of the valve chamber 5 and, at the same time, a portion of such outer circumferential surface of the valve shaft 4 be separated by a gap from the inner wall of the valve chamber 5.

Although this structure may be obtained by using a round metal rod as the valve shaft 4 and cutting a plurality of recessed grooves into the circumferential surface thereof along the longitudinal direction, this increases the cost for cutting the recessed grooves. On the other hand, the fabrication cost can be reduced greatly in the providing simple lathe work of merely chamferring the corners of a square rod aligned with the inner diameter of the valve chamber 5 as shown in FIG. 3.

As shown in FIG. 3, the valve seat 10 is secured to the hollow body 16 by means of a flat-head screw 20, while the cylindrical tube 18 is secured to the hollow body 16 by means of a flat-head screw 21.

A valve body 2 having a sheet-like packing 22 embedded therein is formed at the top end of the valve shaft 4, so that the surface of the sheet-like packing 22 is abutted under pressure against a protrusion 10a formed on the valve seat 10 along the circumference of the fluid port 1A in a closed state of the valve in which the valve body 2 is abutted against the valve seat 10.

Since the sheet-like packing 22 of the valve body 2 to be abutted against the valve seat 10 is embedded at the top end of the valve shaft 4, no excess pressure is applied to the sheet-like packing 22 and, accordingly, it is possible to improve sealing performance by using a flexible rubber packing, as well as moderate abrasion or damage thereof to improve the durability.

Then, a piston 7 having the second cylindrical magnet ML is slidably fitted over the outside of the cylindrical tube 18 fixed to the hollow body 16 by means of the flat-top screw 21. A pair of wearing members 23 and 23 which are in contact with the outer circumferential surface of the cylindrical tube 18 are fitted to the inside of the piston 7 on both of the forward and rearward ends thereof relative to the cylindrical magnet ML, so that abrasion of the cylindrical magnet ML caused by sliding movement of the piston 7 can be prevented.

A spring 24 is fitted over the outer circumference of the piston 7 for resiliently biasing the piston 7 in the direction of closing the valve and, further, a cylindrical cover 25 that constitutes a barrel for the cylinder 8 is covered over the outside of the spring. The cylindrical cover 25 has a flange 25a formed at the rear end thereof for tightly receiving the end of the cylindrical tube 18. The flange 25a is retained by a connection member 26 to be screwed into the cylindrical tube 18 and clamped while being fitted over the hollow body 16.

Upon conducting maintenance and checking or replacing parts for the automatic valve with such a structure, all of the parts can be removed easily by merely detaching the connection member 26 screwed into the cylindrical tube 18 and then detaching the cylindrical cover 25 fitted over the outer circumference of the hollow body 16.

The flange 25a has a discharge hole 27 perforated therein for discharging air from the cylinder 8 when pressurized air for driving the piston 7 is supplied from the fluid port 9 perforated in the hollow body 16. As shown by the cross sectional views of FIG. 1 and of FIG. 4, the discharge hole 27 comprises a round-about channel 27a consisting of a recessed groove cut into an arcuate shape along the inner circumferential surface of the flange 25a, which is in close contact with the outer circumferential surface of the cylindrical tube 18, an air discharge channel 27b consisting of a perforation formed from the inside of the recessed groove of the round-about channel 27a toward the outer circumferential surface of the cylindrical cover 25, and an air discharge channel 27c consisting of a perforation formed from the inside of the recessed groove of the roundabout channel 27a to the inside of the cylinder 8 in a direction diametrically opposite to the air discharge channel 27b in relation with the cylindrical tube 18.

Then, when the piston 7 is caused to move slidably by pressurized air supplied from the port 9 against the resiliency of the spring 24 in the direction of opening the valve, the air in the cylinder 8, pressurized by the piston 7, is passed from the air discharge channel 27c opened to the inside of the cylinder 8 through the roundabout channel 27a bent in an arcuate form and the air discharge channel 27b, and then released to the outside of the cylinder 8.

In this way, since the air discharge hole 27 has such a shape of communicating the air discharge channel 27c opened to the inside of the cylinder 8 with the air discharge channel 27b opened to the outside of the cylinder 8 by way of the round-about arcuate channel 27, when cleaning solvent is blown onto the surface of the automatic valve for cleaning off contaminations such as paint, etc. deposited on the surface, intrusion of the solvent blown onto the inside of the cylinder 8, which would otherwise deteriorate the rubber packing etc., can surely be prevented.

That is, since the solvent entering from the outside of the cylinder 8 through the air discharge channel 27b is hindered by the round-about arcuate channel 27 and can not reach as far as the discharge channel 27c, it is no worry that the packings such as O-rings disposed in the cylinder 8 may be deteriorated by the solvent.

The air discharge hole 27 can be fabricated easily by at first forming the round-about channel 27a by cutting a recessed groove into the inner circumferential surface of the flange 25a, perforating the discharge channel 27b extended from the outer circumferential surface of the flange 25a to the round-about channel 27a, perforating the air discharge channel 27c by forming a hole of a predetermined length from the inside of the roundabout channel 27a toward the direction diametrically opposite to the air discharge channel 27b and forming a hole so as to be in communication with the above-mentioned hole from the inside of the cylinder 8.

In FIG. 1, a holder 28 for mounting the automatic valve to the manifold, etc. of a color-change device (not illustrated) is interposed between the hollow body 16 and the valve seat 10 and secured together with the valve seat 10 to the hollow body 16 by means of the flat-head screw 20.

The connection member 26 is connected to a paint pipeway in communication with a paint supply source (not illustrated), and has a port 1B formed therein for flowing the paint supplied through the paint pipeway into the valve chamber 5.

Thus, flow ports 1A and 1B for the paint are formed on both axial ends of the channel 8, while being opposed to both of the top and rear ends of the valve shaft 4, respectively.

OPERATION OF THE AUTOMATIC VALVE

The ON-OFF operation of the automatic valve described above is to be explained below.

In the present embodiment, the respective ring magnets 3, 3,—constituting the first cylindrical multi-layered magnet MS and respective ring magnets 6, 6,— constituting the second cylindrical multi-layered magnet ML are stacked as described above and shown in FIG. 2 such that identical N poles or identical S poles face each other in each pair of axially adjacent ring magnets. Accordingly, a great quantity of magnetic fluxes generated, for example, from the two N poles of the axially adjacent ring magnets 3, 3 are concentrated toward the two S poles of the axially adjacent pair of ring magnets 6, 6—radially opposed therewith by way of the cylindrical tube 18, and strong magnetic attraction force is exerted between the cylindrical multi-layered magnets MS and ML.

That is, as in the case of the cylindrical magnets MS and ML in this embodiment, when the plurality of ring magnets are stacked such that the identical poles are faced to each other in each pair of axially adjacent rings, a great quantity of magnetic fluxes are generated, for example, from the two opposed N poles in each axially adjacent pair of ring magnets 3, 3, constituting the cylindrical magnet MS, and the magnetic fluxes are concentrated toward the two S poles of the corresponding axially adjacent pair of ring magnets 6, 6,—in the cylindrical magnet ML by way of the cylindrical tube 18. Accordingly, the magnetic attraction force exerted between the cylindrical magnets ML and MS is extremely increased.

Accordingly, although a gap is formed between the outer circumference surface of the cylindrical magnet MS and the inner wall of the valve chamber 5, for constituting the channel 19, to thereby space the cylindrical magnets MS and ML apart slightly, since these magnets MS and ML attract with each other by an extremely intense magnetic force, the valve shaft 4 attached with the cylindrical magnet MS can surely be moved slidingly in the direction of opening the valve against the resiliency of the spring 24.

Further, in a state wherein the valve is closed as shown in FIG. 1, in which the valve body 2 formed on the top end of the valve shaft 4 is abutted against the valve shaft 10, since the respective ring magnets 6, 6,—in the cylindrical magnet ML are so situated that they are slightly deviated axially relative to the respective radially opposed ring-magnets 3, 3,—constituting the cylindrical magnet MS in the direction of closing the valve, with the polarity being different between each of radially opposed pair of ring magnets 3 and 6, the valve shaft 4 attached with the cylindrical magnet MS is strongly energized by the component of the magnetic attraction force exerted downwardly (in the drawing) from each of the ring magnets 6, 6,—to each of the ring magnets 3, 3,—in the direction of closing the valve.

Thus, the valve body 2 formed at the top end of the valve shaft 4 can be maintained in a completely closed state even if the back pressure of a fluid (paint) e.g., is exerted from the port 1A.

Accordingly, in the case of using the automatic valve of this embodiment as the color-change valve of a multicolor coating apparatus, it is possible to prevent the valve body 2 from separating from the valve seat 10 by the pressure of paint of different color exerted from the port 1A and prevent paint of different color from intruding into the valve chamber 5, thereby causing mixing of paint colors.

Next, in the case of opening the automatic valve, pressurized air is supplied from the port 9 perforated in the hollow body 16. This causes the piston 7 fitted with the cylindrical magnet ML to move slidingly by the pressure of air against the resiliency of the spring 24 in the direction of opening the valve.

Thus, the cylindrical magnet MS magnetically attracted by the cylindrical magnet ML fitted to the piston 7 is caused to move slidingly along with the movement of the piston 7 in the direction of opening the valve, by which the valve body 2 formed at the top end of the valve shaft 4 is separated from the valve seat 10 to open the port 1A.

When the piston 7 is caused to slide in the direction of opening the valve, air in the cylinder 8 is pressurized by the piston 7 and discharged externally through the air discharge port 27.

The automatic valve can be closed merely by interrupting the supply of the pressurized air from the port 9, in which the piston 7 is caused to slide automatically in the direction of closing the valve by the resiliency of the spring 24 to return to the state shown in FIG. 1.

In the case of cleaning the inside of the valve chamber 5 of the automatic valve when the valve is being used as a colorchange valve, the valve is opened and a cleaning solvent is introduce through the port 1B, passed through the channel 19 in the valve chamber 5 and then discharged from the port 1A. Thus, the paint deposited and remaining on the inner wall surface of the valve chamber 5 and the surface of the valve shaft 4 and of the cylindrical magnet MS can be completely cleaned and removed with no color residue of the paint remaining. Thus, the valve does not suffer from solidification of paint remaining between the outer circumferential surface of the cylindrical magnet MS and the inner wall surface of the valve chamber 5, which would otherwise hinder the sliding movement of the cylindrical magnet MS.

Figure 5:
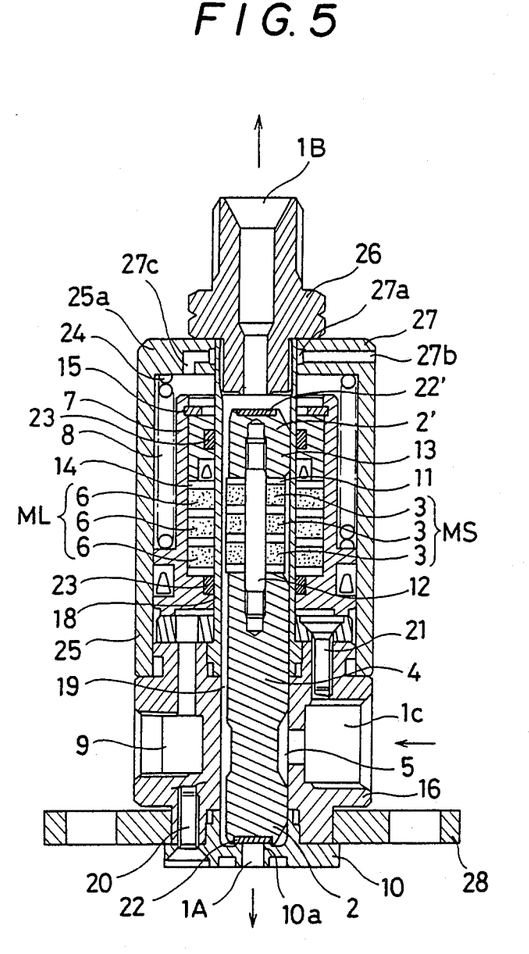
FIG. 5 is a longitudinal cross sectional view showing another embodiment of a automatic valve according to the present invention.

Although explanations have been made referring to the case shown in FIG. 1, wherein the automatic valve is constituted as a two-way valve, the valve is not restricted only thereto but it may be a three-way valve, for example, as shown in FIG. 5.

Specifically, FIG. 5 is a cross sectional view illustrating another embodiment of the automatic valve according to the present invention, in which another fluid port 1C is further disposed in addition to the fluid ports 1A and 1B.

The port 1C is perforated in the hollow body 16 and connected, for example, with a paint supply source (not illustrated). When the automatic valve is in a closed state, as shown in FIG. 5, a paint supplied from the paint supply source and introduced through the port 1C is circulated by way of a route such that it flows through the channel 19 in the valve chamber 5 toward the port 1B formed at a position axially opposite to the port 1A, flows out from the port 1B and then is returned to the paint supply source.

Valve bodies 2, 2' are formed at both of the top and the rear ends of a valve shaft 4 for alternately closing the ports 1A and 1B, respectively. The valve body 2' has such a structure that a sheet-like packing 22' is embedded in the end of a nut 13 that is screw-coupled over a bolt 12 protruded from the rear end of the valve shaft 4 like that in the valve body 2.

Thus, when the automatic valve is opened, the port 1B through which paint flows from the port 1C to the inside of the valve chamber 5 toward the paint supply source is now closed by the valve body 2' and, at the same time, the port 1A closed until then by the valve body 2 is now opened and the paint flowing from the port 1C to the inside of the valve 5 is discharged out of the port 1A and supplied to the coating apparatus.

In the drawing, since other components or members are the same as those shown in FIG. 1, they carry the same reference numerals as in FIG. 1 and detailed explanations of them are omitted.

As has been described above, in the automatic valve according to the present invention, since the first cylindrical multi-layered magnet of a smaller diameter attached to the rear end of the valve shaft and slidably enhoused axially within the valve chamber and a second cylindrical multi-layered magnet of a greater diameter disposed axially slidably to the outside of the valve chamber for causing the valve shaft to move slidingly by the magnetic attraction force, each comprising a plurality of ring magnets, are stacked such that respective axially adjacent magnets are opposed to each other with their identical magnetic poles being faced to each other, the magnetic attraction force exerted between both of the cylindrical magnets is increased extremely. In addition, since the respective ring magnets constituting the second cylindrical magnet are so situated that they are slightly deviated axially in the direction of closing the valve relative to the respective radially opposed ring magnets of the first cylindrical magnet, the valve shaft attached the cylindrical magnet is energized in the direction of closing the valve by the magnetic attraction force exerted between both of the magnets Accordingly, the valve formed at the top end of the valve shaft can be maintained in a completely closed state against the backward fluid pressure exerted thereon.

Furthermore, since the piston including the second cylindrical magnet is energized by the resiliency of the spring disposed in the cylinder in the direction of closing the valve, only one fluid port is necessary for pressurized air for driving the piston, and the number of air hose pipeways for supplying the pressurized air is reduced thereby enabling one to decrease the installation cost and the installation space.

Furthermore, since the discharge hole used for directly discharging the air from the cylinder to the outside when the pressurised air is supplied to drive the piston has such a shape that the discharge channel opened to the inside of the cylinder and the discharge channel opened to the outside of the cylinder are in communication with each other by way of a roundabout bent channel, if a cleaning solvent is blown onto the surface of the automatic valve, there is no worry that the solvent will infiltrate into the cylinder to deteriorate the packings, etc, made of rubber.

Furthermore, in the case of cleaning a paint remaining in the valve chamber with a solvent, etc., since the solvent entering, for example, from the fluid port on the side of the rear end of the valve shaft is passed through the channel formed between the outer circumferential surface of the valve shaft and of the first cylindrical magnet attached to the rear end of the shaft and the inner wall surface of the valve chamber and then discharged out of the port on the side of the top end of the valve shaft, paint deposited on the surface of the valve shaft and of the first cylindrical magnet and to the inner wall surface of the valve chamber can be completely be eliminated with no color residue, which can surely prevent the problem that paint remaining between the outer circumferential surface of the first cylindrical magnet and the inner wall surface of the valve chamber solidifies to hinder sliding movement of the cylindrical magnet.

What is claimed is:

1. An automatic valve comprising:
    a valve chamber having at least two fluid ports, including one at a top end thereof and another at a rear end thereof, and an inner circumferential wall surface between said ends thereof;

a valve shaft contained in the valve chamber for sliding in the axial direction of said valve shaft and valve chamber, said valve shaft having a top end and a back end, and an outer circumferential wall surface between said ends thereof;

said valve shaft having a valve body formed at said top end thereof for closing one of said fluid ports and having a first cylindrical multi-layered magnet attached at said rear end of said valve shaft and comprising a first plurality of axially stacked ring magnets, said first cylindrical multi-layered magnet having a radially outer circumferential surface;

a cylinder disposed outside of and coaxially with said valve chamber;

a piston disposed axially slidably within said cylinder and adapted to move in a direction for opening the valve by application of pressure of a pressurized gas thereto;

a second cylindrical multi-layered magnet comprising a second plurality of axially stacked ring magnets, which is integrally constituted as a part of said piston, said second cylindrical multi-layered magnet having a radially inner diameter which is larger than the radially outer diameter of said first cylindrical multi-layered magnet, and said second cylindrical multi-layered magnet being arranged coaxially with the first cylindrical magnet such that the respective ring mag nets in the first cylindrical magnet and the respective ring magnets in the second cylindrical magnet are radially opposed to each other with different magnetic polarity; in which:

the respective ring magnets are stacked in each of the first and the second cylindrical magnets such that identical magnetic poles are faced to each other in each axially adjacent pair of ring magnets, and the respective ring magnets in the second cylindrical magnet are so situated that they are axially displaced slightly toward the direction of closing the valve relative to the respective radially opposed ring magnets in the first cylindrical magnet with different magnetic polarity;

said valve chamber comprising a cylindrical inner wall defining therein a flow channel extending from said one fluid port formed at said top end to said other fluid port formed at said rear end of said valve chamber, and said flow channel being formed axially linearly between said inner circumferential wall surface of said valve chamber and said outer circumferential surface of said valve shaft and said outer circumferential surface of said first cylindrical magnet.

2. The automatic valve of claim 1, further comprising:

said valve shaft having a chamfered-corner rectangular transverse cross-sectional shape that inscribes the inner circumferential wall surface of said valve chamber at each of four chamfered corners thereof while defining respective axially linear flow channels between each of four side faces thereof and the inner circumferential wall surface of the chamber, the outer diameter of said first cylindrical multi-layered magnet attached to the rear end of said valve shaft being smaller than the inner diameter of said valve chamber.

3. An automatic valve comprising:

a valve chamber having at least two fluid ports, including one at a top end thereof and another at a rear end thereof, and an inner circumferential wall surface between said ends thereof;

a valve shaft contained in the valve chamber for sliding in the axial direction of said valve shaft and valve chamber, said valve shaft having a top end and a back end, and an outer circumferential wall surface between said ends thereof;

said valve shaft having a valve body formed at said top end thereof for closing one of said fluid ports and having a first cylindrical multi-layered magnet attached at said rear end of said valve shaft and comprising a first plurality of axially stacked ring magnets, said first cylindrical multi-layered magnet having a radially outer circumferential surface;

a cylinder disposed outside of and coaxially with said valve chamber;

a piston disposed axially slidably within said cylinder and adapted to move in a direction for opening the valve by application of pressure of a pressurized gas thereto;

a second cylindrical multi-layered magnet comprising a second plurality of axially stacked ring magnets, which is integrally constituted as a part of said piston, said second cylindrical multi-layered magnet having a radially inner diameter which is larger than the radially outer diameter of said first cylindrical multi-layered magnet, and said second cylindrical multi-layered magnet being arranged coaxially with the first cylindrical magnet such that the respective ring magnets in the first cylindrical magnet and the respective ring magnets in the second cylindrical magnet are radially opposed to each other with different magnetic polarity;

said valve chamber comprising a cylindrical inner wall defining therein a flow channel extending from said one fluid port formed at said to pend to said other fluid port formed at said rear end of said valve chamber;

said flow channel being formed axially linearly between said inner circumferential wall surface of said valve chamber and said outer circumferential surface of said first cylindrical magnet; in which:

a spring effectively bearing against the piston for resiliently energizing said piston toward the direction of closing the valve, the cylinder has a port formed at a position corresponding to one side of said piston for receiving a pressurized gas for causing said piston to move slidingly against the resiliency of the spring in the direction of opening the valve and a discharge hole formed at a position corresponding to the other side of said piston, and said discharge hole comprising a first discharge channel which is open to the inside of said cylinder, a second discharge channel which is open to the outside of said cylinder and a part-circumferentially extending channel communicating both of said first and second discharge channels with each other.

* * * * *